(12) United States Patent
Luther-Davies

(10) Patent No.: US 9,804,476 B2
(45) Date of Patent: Oct. 31, 2017

(54) OPTICAL PARAMETRIC GENERATOR

(71) Applicant: The Australian National University, Acton Australian Capital Territory (AU)

(72) Inventor: Barry Luther-Davies, Matcham (AU)

(73) Assignee: The Australian National University, Acton, Australian Capital Territory ( * ) Notice: Subject to any disclaimer, the term of this patent is extended or adjusted under 35 U.S.C. 154(b) by 0 days.

(21) Appl. No.: 15/314,462

(22) PCT Filed: May 20, 2015

(86) PCT No.: PCT/AU2015/000289
§ 371 (c)(1),
(2) Date: Nov. 28, 2016

(87) PCT Pub. No.: WO2015/179894
PCT Pub. Date: Dec. 3, 2015

(65) Prior Publication Data
US 2017/0199444 A1 Jul. 13, 2017

(30) Foreign Application Priority Data
May 29, 2014 (AU) .................. 2014902040

(51) Int. Cl.
*G02F 1/39* (2006.01)
*H01S 3/10* (2006.01)
*G02F 1/355* (2006.01)
*H01S 3/00* (2006.01)
*H01S 3/16* (2006.01)

(52) U.S. Cl.
CPC .............. *G02F 1/39* (2013.01); *G02F 1/3551* (2013.01); *H01S 3/0092* (2013.01); *H01S 3/10053* (2013.01); *H01S 3/16* (2013.01); *H01S 3/1625* (2013.01); *H01S 3/1636* (2013.01)

(58) Field of Classification Search
CPC ......... G02F 1/3551; G02F 1/39; H01S 3/0092
See application file for complete search history.

(56) References Cited

U.S. PATENT DOCUMENTS

| 6,031,853 A * | 2/2000 | Greene | ..................... G02F 1/39 359/330 |
| 9,099,837 B2 * | 8/2015 | Miesak | ..................... G02F 1/39 |
| 2005/0271094 A1 * | 12/2005 | Miller | ..................... G02F 1/39 372/25 |

FOREIGN PATENT DOCUMENTS

| WO | 2004049056 | 6/2004 |
| WO | 2005112207 | 11/2005 |
| WO | 2009000021 | 12/2008 |

(Continued)

*Primary Examiner* — Daniel Petkovsek
(74) *Attorney, Agent, or Firm* — Patent Ingenuity, P.C.; Samuel K. Simpson

(57) ABSTRACT

An optical parametric generator comprises a seed laser feeding an optical system. The seed laser is arranged to provide a seed beam at either a signal frequency of a signal wave or an idler frequency of an idler wave. Further, the optical parametric generator comprises a pump laser of a defined type feeding the optical system. The pump laser emits ultra-short optical pulses as a pump wave. In addition, the optical parametric generator comprises a second order non-linear crystal of a defined type arranged in the optical system. The defined type of the crystal and the defined type of the pump laser are selected so that the signal wave or the idler wave are locked in an edge of the pump wave.

18 Claims, 11 Drawing Sheets

(56) References Cited

FOREIGN PATENT DOCUMENTS

| WO | 2012092362 | 7/2012 | | |
|----|------------|--------|---|---|
| WO | WO 2015179894 A1 * | 12/2015 | ............... | G02F 1/39 |

* cited by examiner

OPTICAL PARAMETRIC GENERATOR

TECHNICAL FIELD

The present invention relates generally to optical parametric generators.

BACKGROUND

Currently several different coherent optical sources exist that produce outputs in the mid infra-red region including, for example, quantum cascade lasers, infrared diode lasers, gas lasers notably $CO_2$ and CO and optical parametric oscillators and optical parametric generators. For many of these systems the output is in the form of continuous emission or relatively long pulses in the picosecond or nanosecond range. Sources of sub-picosecond pulses in this wavelength range are relatively few and are restricted to complex systems based on synchronously pumped optical parametric oscillators (OPO) where the pump powers need not be very high, or optical parametric generators (OPG) which need to be pumped by very powerful ultra-short pulse lasers.

Nonlinear optical devices such as optical parametric amplifiers (OPA), optical parametric oscillators (OPO) and optical parametric generators (OPG) can all be based on three-wave mixing (3WM). These types of devices can be used to generate coherent mid infrared light. In such devices three waves at different optical frequencies interact in a second order nonlinear material, which is a material that displays a polarization quadratically proportional to the applied optical electric field. Only anisotropic materials display second order nonlinearity such as ferroelectric crystals. In the case of OPOs and OPAs it is conventional to designate the highest frequency wave the pump wave; the intermediate frequency wave the signal wave; and the lowest frequency wave the idler wave.

If the pump wave has an angular frequency $\omega_p$, the signal wave an angular frequency $\omega_s$ and the idler wave an angular frequency $\omega_i$, in order to conserve energy the following relation holds: $\omega_p = \omega_s + \omega_i$. There is no particular restriction on the values $\omega_{p,s,i}$ for energy conservation. However, for energy to transfer efficiently between these interacting waves a second condition must simultaneously be satisfied that represents momentum conservation. This is described by the relation $k_p = k_s k_i$ where $k_{p,s,i}$ are the wave-vectors of the interacting waves and $k_{p,s,i} = n_{p,s,i} \omega_{p,s,i}/c$ where $n_{p,s,i}$ are the linear refractive indices at the pump signal and idler frequencies respectively. Since, in general, $n_p \neq n_s \neq n_i$ due to dispersion of the refractive index, then momentum conservation requires the use of special techniques. Several of these exist and include birefringent phase matching where the polarizations of the waves and the direction of propagation relative to the crystallographic axes in a birefringent crystal are chosen to achieve the phase matching condition; and quasi phase matching via periodic poling where the sign of the optical nonlinearity is reversed periodically along the propagation direction to achieve constructive interference of the generated signal and idler waves generated from different regions along the nonlinear crystal. In the latter case the periodic reversal of the sign of the nonlinearity creates an additional wave vector $k_g = 2\pi/\Lambda_g$ where $\Lambda_g$ is the period of the grating such that the phase matching relation becomes $k_p = k_s + k_i + k_g$. An appropriate change of $\Lambda_g$ allows phase matching to be achieved.

The interaction between the waves is described by three coupled wave equations that can be found in many standard texts. It is worth noting that the energy conservation condition implies that destruction of a pump photon leads to creation of a pair of photons at the signal and idler frequencies. Thus energy is transferred from the pump wave to the signal wave and idler wave and this implies that the signal and idler waves may be amplified at the expense of the pump wave. In certain approximations, the gain at the signal and idler frequency can be represented by analytic expressions and again these can be found in standard texts.

When phase matched by using either birefringent phase matching or quasi phase matching, the total gain can be simplified as: $G = \frac{1}{4} \exp(2\Gamma l)$ where $\Gamma$ is the parametric gain coefficient, $l$ is the propagation distance through the material and $\Gamma = \mathrm{sqrt}(2\omega_s \omega_i d_{\mathit{eff}}^2 I_p / n_p n_s n_i \epsilon_o c^3)$ where $I_p$ is the pump intensity, $d_{\mathit{eff}}$ is the effective second order nonlinearity of the material; $\epsilon_o$ is the permittivity of free space and $n_{p,s,i}$ are the linear refractive indices at the pump, signal and idler respectively. It is worth noting that the gain of a parametric amplifier can be very large (>60 dB/cm) at intensities below the optical damage threshold of the material at least when using short optical pulses with duration less than a few picoseconds. In this respect optical parametric amplifiers can provide very much higher gain than common laser media.

The analytic expression for the gain presented above assumes the interaction occurs between continuous waves or relatively long pulses in the nonlinear crystal. However, as the pulses become shorter and, in particular, when they become shorter than about a picosecond, an additional factor must be taken into account.

In a homogeneous linear material the speed of propagation of a short pulse of less than a picosecond is determined by its group index, which at wavelength $\lambda$ is determined by $n_g = n - \lambda dn/d\lambda$, where n is the linear refractive index of the medium at wavelength $\lambda$. Due to dispersion of the refractive index the group indices at different wavelengths are also different, which leads to pulses at different wavelengths propagating at difference group velocities given by $v_g = c/n_g$. The group velocity generally denotes the speed at which the peak of a pulse propagates and differs from the phase velocity of the wave fronts that make up the pulse that is determined directly by the refractive index, n. In addition, the pulses spread in time due to group velocity dispersion (GVD), where $GVD = -\lambda/c \, d^2n/d\lambda^2$. The values of both these parameters can vary significantly with wavelength.

By way of illustration, consider the case of a parametric amplifier based on periodically poled lithium niobate (PPLN). If we choose a pump wavelength at 1.04 μm which is close to that available from common neodymium or Ytterbium lasers, and a signal wavelength at 1.407 μm, which combined would generate an idler at 4 μm. The group velocities of the pump, signal and idler are c/2.21004; c/2.18242; c/2.23573 respectively where c is the speed of light in vacuum which is approximately $3 \times 10^8$ m/s. If we consider the case of pulses 100 fs in duration, then the pump and signal will separate after a propagation distance of only 1.09 mm in the crystal and the pump and idler after 1.17 mm. Thus, 3WM is usually limited only to mm lengths of the crystal at least for collinear propagation. Since the effective crystal length is very short this means that the total gain will be small unless extremely high laser intensity is used. The latter situation can be achieved in optical parametric generators pumped by very powerful short pulse lasers (>$10^9$ W) such as femtosecond amplified titanium sapphire lasers. Several commercial examples of this technology exist; however, these systems are both costly and complex and produce output pulses with very high peak powers which are unsuitable for many applications.

If the intensity remains low or moderate, the gain drops to a few dB/cm and this is only sufficient to create a so-called synchronously-pumped OPO. In this device, a pump laser generating short pulses at a high repetition rate (typically ≈50 MHz) pumps a short amplifying crystal contained within its own optical resonator which circulates pulses at either the signal or idler frequency (or both). The pulses return to the nonlinear crystal periodically and are amplified by the synchronous pump pulses, but only if the round trip time of the OPO resonator is carefully matched to the round trip time in the pump oscillator resonator. In such round trip matching conditions, pulses at the signal or idler wavelength can be amplified in successive transits of the OPO cavity and power in the signal and idler waves grows from noise. As this power grows, energy is transferred from the pump wave to the signal and idler waves. However, the round trip times of the two resonators (laser and OPA) must exactly match and the effects of group velocity dispersion between the interacting waves must be minimized, which in general means that the OPO crystal must be short compared with the length required for separation of the pulses due to the difference in their group velocities. Generally the cavity lengths must also be identical at the micron scale over distances of a meter or so. However, maintaining this length match in the face of mechanical or temperature fluctuations is challenging and requires complex locking schemes to obtain stable operation. Group velocity dispersion can be reduced by making the interacting beams non-collinear in the OPO crystal potentially allowing the use of longer crystals; however, the beams must then be large enough to maintain spatial overlap over the crystal length. Generating sub-picosecond sources in the mid infrared by a synchronously pumped OPO involves a high degree of complexity and expensive hardware. Nevertheless, these devices have applications in science and technology for probing vibrational states of molecules or as sources for nonlinear optics and commercial systems based on this principle are available.

SUMMARY

It is an object of the present invention to substantially overcome, or at least ameliorate, one or more disadvantages of existing arrangements.

Disclosed are arrangements which seek to address the above problems by providing an improved optical parametric generator.

According to an aspect of the present invention, there is provided an optical parametric generator comprising: a seed laser feeding an optical system, wherein the seed laser is arranged to provide a seed beam at either a signal frequency of a signal wave or an idler frequency of an idler wave; a pump laser of a defined type feeding the optical system, wherein the pump laser emits ultra-short optical pulses as a pump wave; and a second order non-linear crystal of a defined type arranged in the optical system; wherein the defined type of the crystal and the defined type of the pump laser are selected so that the signal wave or the idler waves are locked in an edge of the pump wave.

According to a further aspect of the present invention, there is provided method of controlling an optical parametric comprising a seed laser feeding an optical system, a pump laser of a defined type feeding the optical system, wherein the pump laser emits ultra-short optical pulses as a pump wave, and a second order non-linear crystal of a defined type arranged in the optical system, the method comprising the steps of: arranging the seed laser to provide a seed beam at either a signal frequency of a signal wave or an idler frequency of an idler wave; and selecting the defined type of the crystal and the defined type of the pump laser so that the signal wave or the idler wave are locked in an edge of the pump wave.

The defined type of the crystal and the defined type of the pump laser may be selected so that a pump wave group velocity lies between a signal wave group velocity and an idler wave group velocity.

Further, the defined type of the crystal and the defined type of the pump laser may be selected so that either or both the signal wave and the idler wave are locked in a leading edge and/or a trailing edge of the pump wave.

Further, the ultra-short optical pulses emitted by the pump laser may be less than 1 picosecond in duration.

Further, the optical parametric generator may be a high gain optical parametric generator. Also, the gain of the optical parametric generator may be in the range 40-70 dB/cm, in the range 50-60 dB/cm, or in the range 60-70 dB/cm.

Further, the defined type of the crystal may be selected from the group consisting of: lithium niobate; lithium tantalate.

Further, the defined type of the crystal may be selected from crystals having a length in the range 5-25 mm.

Further, the defined type of the pump laser may be selected from pump lasers that generate a pump wave having a wavelength range of 750 nm-1100 nm, or 1000 nm-1050 nm, or a wavelength of 1.06 μm.

Further, the defined type of the pump laser may be selected from pump lasers having an active medium in the group consisting of: ytterbium; titanium doped sapphire; neodymium.

Further, the polarisations of the signal wave, idler wave and/or pump wave may be chosen to achieve birefringent phase matching.

Further, the polarisations of the signal wave, idler wave and/or pump wave may be chosen to achieve quasi phase matching in a periodically poled crystal.

Further, the pump wave may be between 750 nm and 1100 nm and the optical parametric generator may convert the pump wave into the mid-infrared range. Also, the crystal may be lithium tantalate, lithium niobate, or potassium titanyl phosphate or its isomorphs.

Further, the length of the crystal may be sufficient to allow complete separation of the interacting pump, idler and signal waves due to their respective group velocities.

Further, the defined type of the crystal and the defined type of the pump laser are selected so that pump wave has a group velocity which is the average of the group velocity of the signal wave and the group velocity of the idler wave.

Further, the relationship between the length of the non-linear crystal and the group indices of the pump, signal and idler waves may be defined by $L_c > c\,\tau_p/(|n_{g:p} - n_{g:s,i}|)$ where $L_c$ is a length of the non-linear crystal, $n_{g:ps,i}$ are group indices of the pump, signal and idler waves respectively and $\tau_p$ is the duration of the pump wave.

Other aspects of the invention are also disclosed.

BRIEF DESCRIPTION OF THE DRAWINGS

Some aspects of various embodiments of the present invention will now be described with reference to the drawings and appendices, in which.

DETAILED DESCRIPTION

Figure 1:
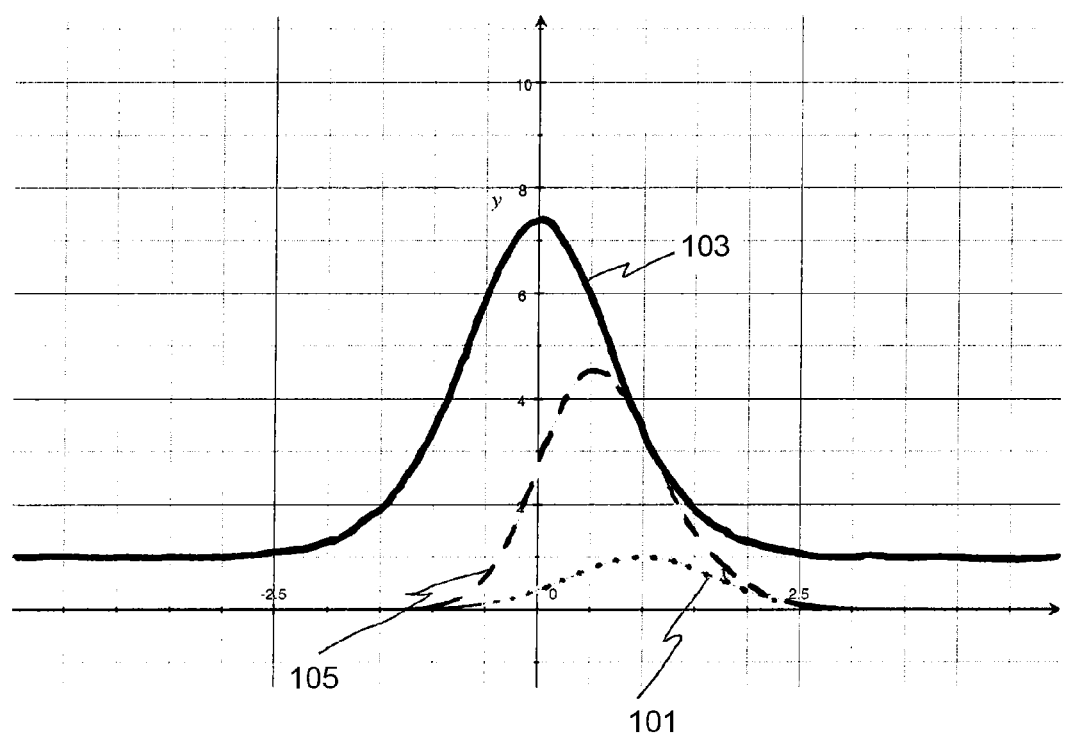
FIG. 1 shows the mechanism by which group velocity dispersion is counteracted by time dependent amplification by the pump wave.
Figure 2A:
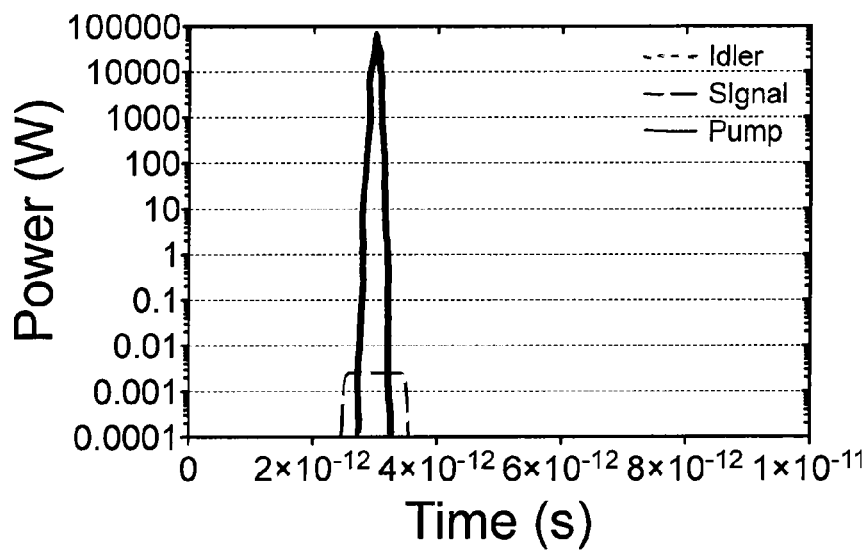
FIGS. 2(a)-(g) show a series of pulse profiles plotted on a logarithmic scale at various distances through a crystal.
Figure 2B:
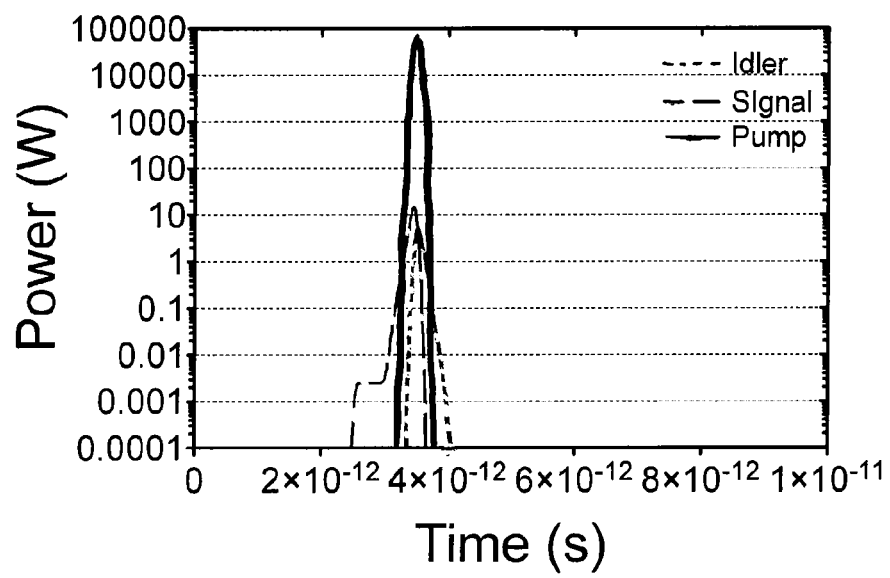
Figure 2C:
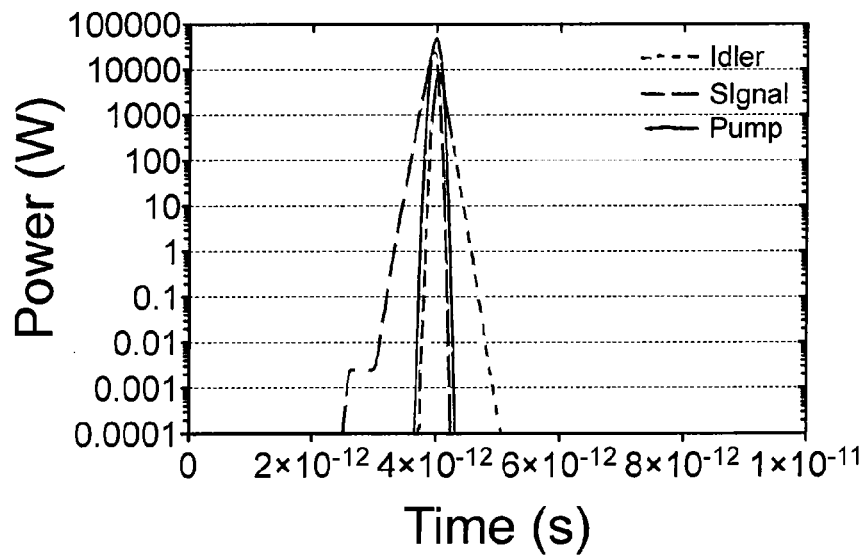
Figure 2D:
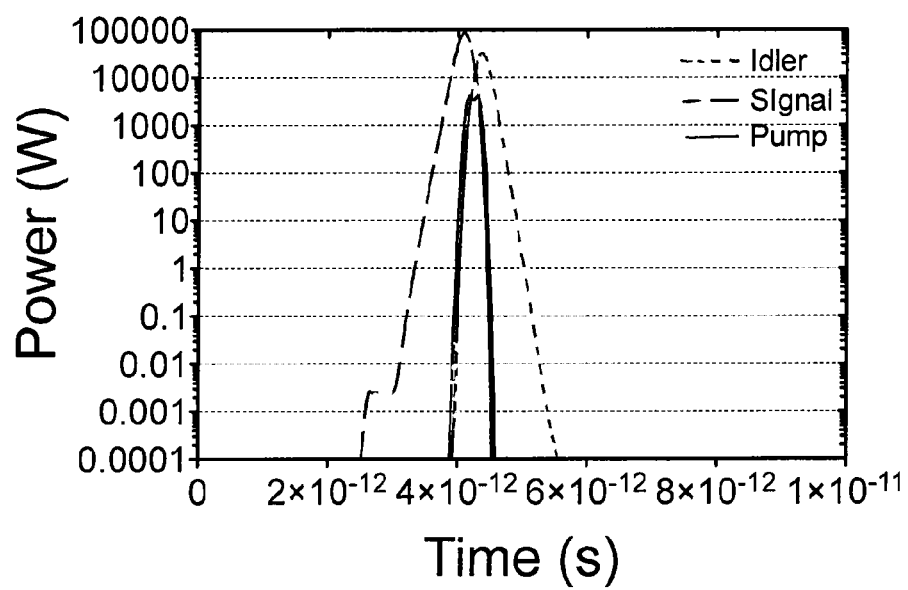
Figure 2E:
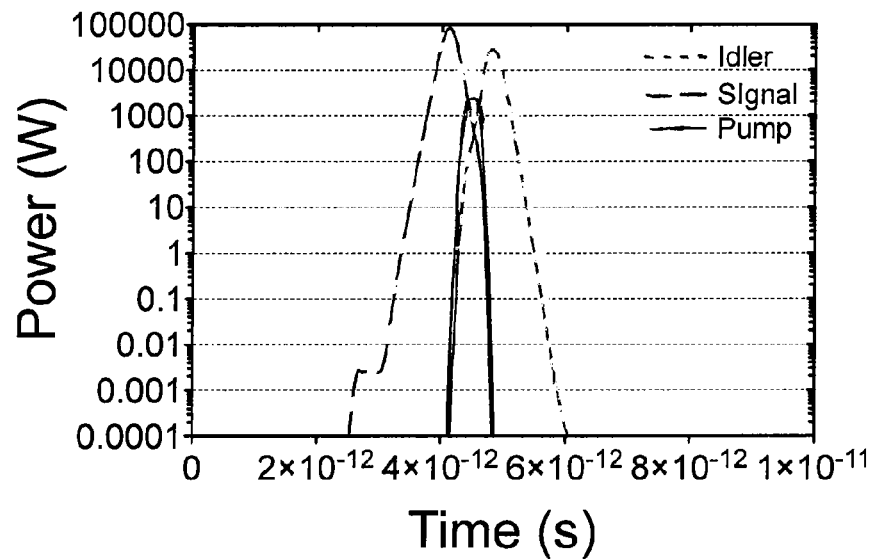
Figure 2F:
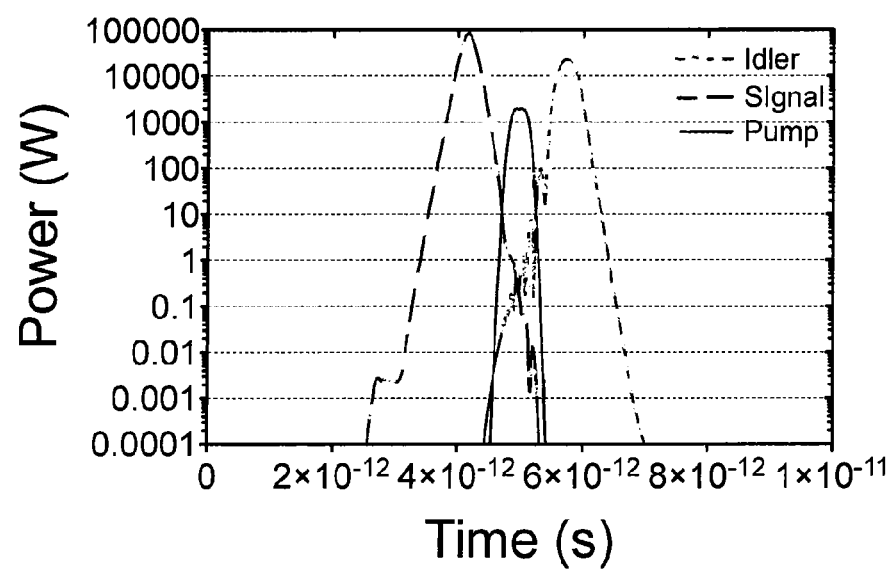
Figure 2G:
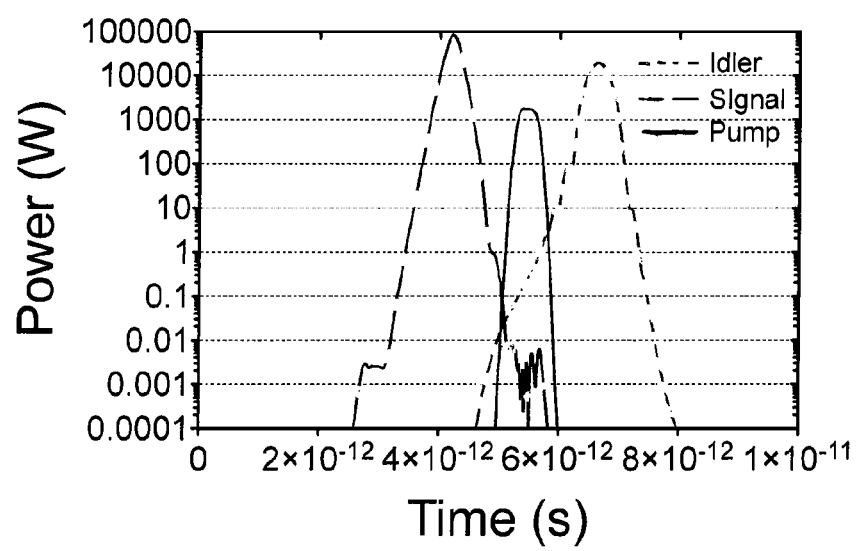

Where reference is made in any one or more of the accompanying drawings to steps and/or features, which have the same reference numerals, those steps and/or features have for the purposes of this description the same function(s) or operation(s), unless the contrary intention appears.

According to one example, the optical parametric generator described herein produces an output in the mid-infrared (2-25 µm) range, which is an exceptionally important wavelength range since in this range all molecules can be identified through their characteristic absorption spectra. In addition the mid infrared range is the region where thermal sources can be identified by their characteristic emissions and hence is important for sensing and defence applications.

The herein described optical parametric generator is therefore suitable for use in a number of different scientific areas such as, for example, biological and medicinal sciences.

As discussed in the background, it is noted that each of the signal, idler and pump pulses in an optical parametric generator propagate at different group velocities $v_{gp}$, $v_{gs}$, and $v_{gi}$. Pulse spreading during propagation is governed by group velocity dispersions $GVD_p$, $GVD_s$ and $GVD_i$. Typically the difference in the group velocities may inhibit the transfer of power from a pump wave to a signal wave and idler wave when the pulses are very short because the three pulses separate rapidly in time as they propagate through the nonlinear crystal. To achieve 3WM and parametric amplification the pulses must overlap with each other.

The herein described examples provide an alternative way of generating ultra-short pulses that permit vastly simplified hardware compared with the techniques described in the background section.

A technique is described wherein a high gain optical parametric amplifier is configured to allow pump wave pulses to undergo a single pass through a relatively long optical parametric amplifier crystal such as, for example, periodically poled lithium niobate (PPLN). Examples of other suitable configurations are also provided.

As will be explained in more detail below, it will be understood that the length of the crystal should be sufficient to normally lead to complete separation of the interacting pump, idler and signal waves due to their respective group velocities. That is $L_c > c \, \tau_p/(|n_{g:p} - n_{g:s,i}|)$ where $L_c$ is the length of the nonlinear crystal, $n_{g:p,s,i}$ are the group indices of the pump signal and idler pulses respectively and $\tau_p$ is the duration of the pump pulse.

Further, it will be understood that the optical parametric generator may be configured using a double-pass geometry by reflecting the waves back through the crystal.

It will be understood that other suitable crystal types may also be used, such as, for example, lithium tantalate, or potassium titanyl phosphate or its isomorphs.

The applicant has recognised that, in certain conditions, the deleterious effects of the different group velocities of the interacting pulses can be eliminated and the conditions that best achieve this also improve the efficiency of the optical parametric amplifier.

The basic phenomenon that underpins the operation of the device is outlined in FIG. 1. FIG. 1 shows the mechanism by which group velocity dispersion is counteracted by time dependent amplification by the pump. Consider a powerful Gaussian pump pulse propagating though a nonlinear crystal that induces a large time dependent gain shown schematically by the curve 103. After propagation through a small element of the nonlinear crystal of thickness ∂z the signal pulse 101 (dotted line) is amplified by this time-dependent gain. At the input to this element, the signal pulse 101 which is travelling at a different group velocity from the pump pulse 103, is initially positioned in the leading edge of the pump pulse 103. If the signal pulse 101 were not amplified by the nonlinear interaction with the pump pulse 103, the signal pulse would continue to move to the right relative to the pump pulse 103 due to its different group velocity. However, after passing through the small element of the nonlinear crystal, the signal pulse 101 is amplified by the time dependent gain. Hence at the output of the element it has been distorted by the time dependent gain to create the amplified signal pulse 105 (dashed line). Because the gain increases towards the peak of the pump pulse 103, the trailing edge of the signal pulse 101 receives higher gain than the leading edge and as a result after amplification the peak of the amplified signal pulse 105 has moved closer to the peak of the pump pulse 103. In effect this introduces a motion of the pulse peak that counteracts the group velocity difference between the pump and signal pulses. This mechanism in fact traps the signal pulse in an edge (i.e. the leading edge or trailing edge) of the pump wave and provided the gain is high enough does not allow it to escape until the pump power is depleted by transfer of energy to the signal (and idler) pulse.

The amplification of the signal pulse by the pump pulse also generates the idler pulse, which will travel at a different group velocity from both the pump and signal pulses. Hence for this mechanism to be effective the pump pulse must be able to trap both of the signal and idler pulses for the interaction to be effective.

A particularly favourable situation arises if the group velocity difference between the idler and the pump pulses has the opposite sign to that between the signal and the pump pulses. In other words, the group velocity of the pump pulse lies between those of the signal and the idler pulse. The optimum conditions occur when the pump pulse has a group velocity which is the average of the group velocities of the signal and idler pulses, although the process is reasonably tolerant to deviations about this condition.

According to one example, a PPLN parametric amplifier is provided where the group velocity of the pump, signal and idler waves are c/2.21004; c/2.18242; c/2.23573 respectively where c is the speed of light in vacuum. According to this example, the group velocity of the pump wave is bigger than the group velocity of the idler wave but smaller than the group velocity of the signal wave. The differences between the group velocities are (signal-pump) $1.72 \times 10^6$ m/s and (pump-idler) $1.56 \times 10^6$ m/s, respectively, which makes the differences between the group velocities approximately equal. Thus, if three pulses (pump, signal and idler) are launched into the nonlinear crystal in time synchronization, the signal pulse moves towards the leading edge of the pump pulse as the three pulses pass though the nonlinear crystal and the idler pulse moves towards the trailing edge due to their group velocity differences. Thus by the mechanism illustrated in FIG. 1, because the pump pulse induces a strong time dependent gain, the pump pulse can trap the signal pulse in its leading edge and the idler pulse in its trailing edge cancelling the effects of their different group velocities.

Simulations were performed using SNLO software provide by AS-Photonics LLC, which solves the coupled wave equations using the plane wave approximation but taking the effects of the group velocities, group velocity dispersion and nonlinearity into account. For these simulations, a practical situation was used with a pump pulse 100 fs in duration with approximately 75 kW of peak pump power amplifying a seed beam at the signal frequency. The seed beam power was set at only ≈2.5 mW. To simulate the real situation where the seed beam is provided by a continuous wave laser, a flat-topped seed pulse at 1.407 µm, 1 picosecond long was provided. Thus, to reach a power approximately equal to that of the pump, the gain must be in the range $10^6$ to $10^7$. To achieve this a PPLN crystal 25 mm long was used, which is around 20 times longer than that needed for complete separation of 100 fs signal, pump and idler pulses due to group velocity dispersion.

In this simulation, the input intensity at the pump was $2.5 \times 10^9$ W/cm$^2$ and the input intensity of the seed was 22 W/cm$^2$.

Referring to FIGS. 2(a-g), a series of pulse profiles are plotted on a logarithmic scale at distances of 0.001, 5, 10, 12.5, 15, 20 and 25 mm through the PPLN crystal. The peaks of the signal and idler pulses are locked to the pump pulse by the gain guiding mechanism described in FIG. 1 up until pump depletion becomes strong at about 12.5 mm, after which the pulses travel away from the pump with their normal group velocities.

As is apparent from FIGS. 2(b-d) the signal and idler pulse peaks remain locked in the leading and trailing edges of the pump pulse as they are amplified. Some energy is not trapped and escapes creating the low intensity tails evident in these logarithmic plots. By FIG. 2(c), pump depletion has started and this continues over the next few mm of the crystal. By FIG. 2(e) the pump pulse has become strongly depleted (≈93%) and virtually all the pump power has been transferred to the signal and idler pulses, which contain 69% and 24% of the input pump pulse energy respectively. Due to pump depletion, the gain has been reduced and the signal and idler pulses are no longer trapped by the pump pulse and begin to separate in time travelling at their individual group velocities relative to the pump pulse.

Shown in FIGS. 3(a-e) are the powers of the pump, signal and idler pulses after 10, 12.5, 15, 20 and 25 mm on a linear scale, which provide a clearer indication of the pulse shapes. A series of pulse profiles through the PPLN crystal are shown. As can be seen, by 12.5 mm the signal and idler pulses have started to separate from the pump pulse because the pump power has been depleted and hence the gain has reduced.

Figure 4:
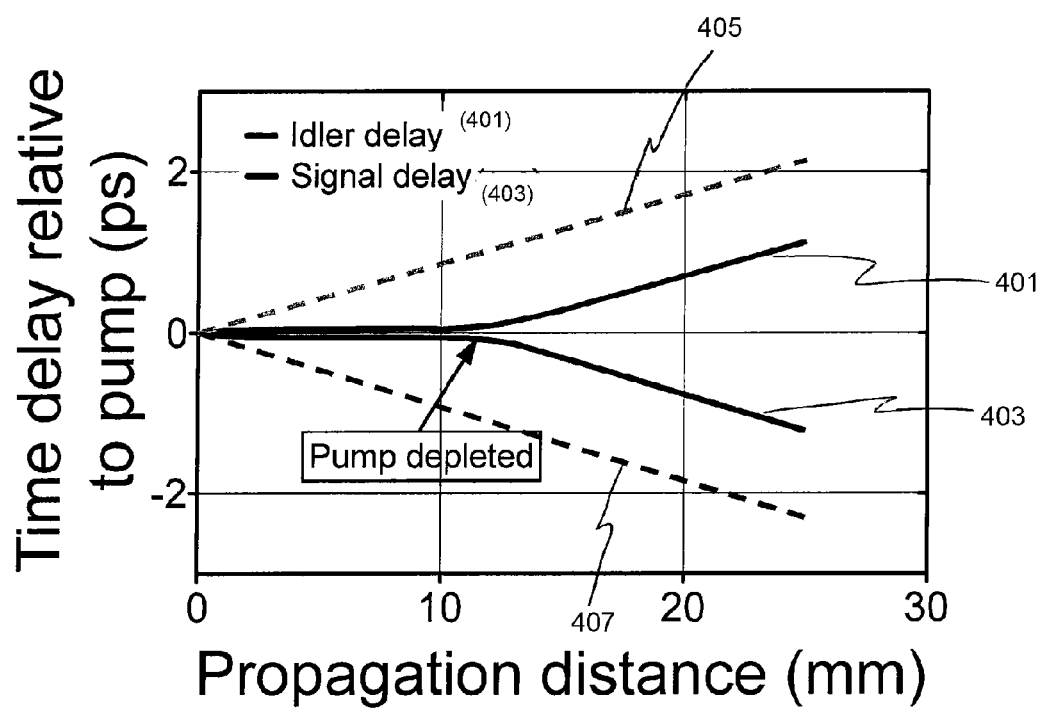
FIG. 4 depicts the separation of signal and idler pulses relative to the peak of a pump pulse.

FIG. 4 depicts the separation of the signal and idler pulses relative to the peak of the pump pulse when extracted from these simulations. FIG. 4 shows how the time separation of the pulse remains small until the pump is depleted, after which they revert to their unperturbed group velocities. Whilst this example was calculated by neglecting spatial effects and hence diffraction, the inclusion of these phenomena does not materially affect the pulse dynamics which are the key to this invention. The delays between the signal and idler pulses relative to the pump pulse: idler pulse (401); signal pulse (403). The separation without the effects of the pump gain is shown for the idler pulse (405) and the signal pulse (407).

An important additional feature of this process is that it leads to high conversion efficiencies than are achievable in conditions where the group velocity differences between the interacting waves are negligible. This occurs because once a large fraction of the pump power has been transferred to the signal and idler pulses, via sum frequency generation, energy flows back from the signal and idler pulses to the pump pulse. The conditions for sum frequency generation are identical to those for optical parametric amplification and the process is known as back-conversion. When this occurs the regenerated pump waves are phase shifted relative to the original pump pulse and this creates distortion. Once the power has been transferred to the pump pulse, parametric amplification again dominates transferring energy back to the signal and idler pulses. Since these processes occur at different rates at different times during the pulse and at different positions in the beam, the pulses and beams become highly distorted and this reduces their usefulness. It additionally limits the conversion efficiency that can be achieved before unacceptable deterioration in the beam and pulse quality occurs to around 30% (total signal and idler output/pump input).

Figure 3A:
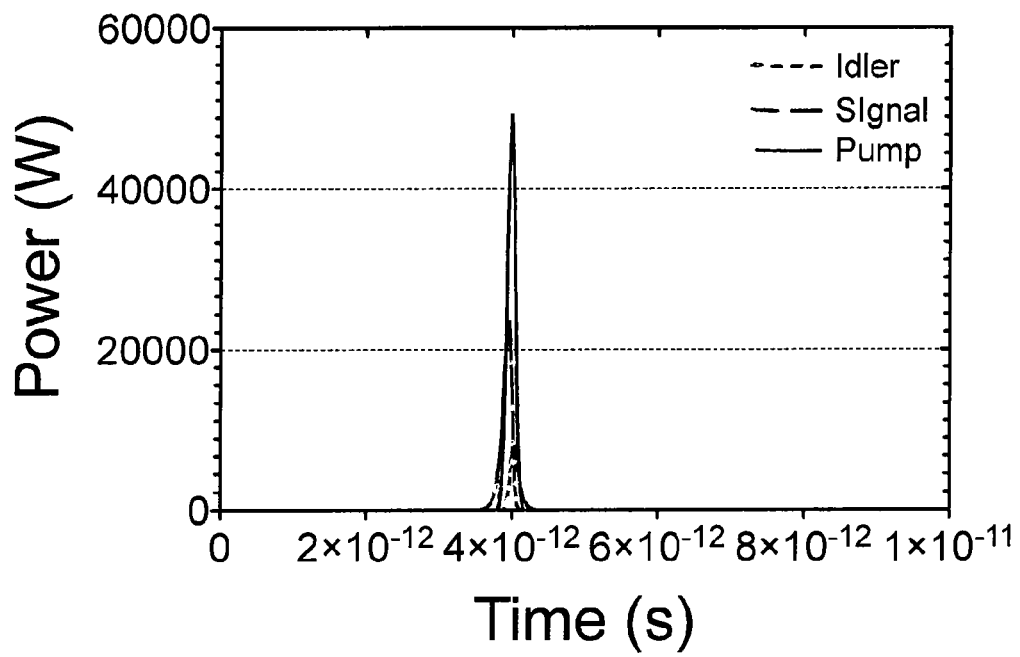
FIG. 3(a)-(e) show a series of pulse profiles on a linear scale showing the powers of the pump, signal and idler waves at various distances through a crystal.
Figure 3B:
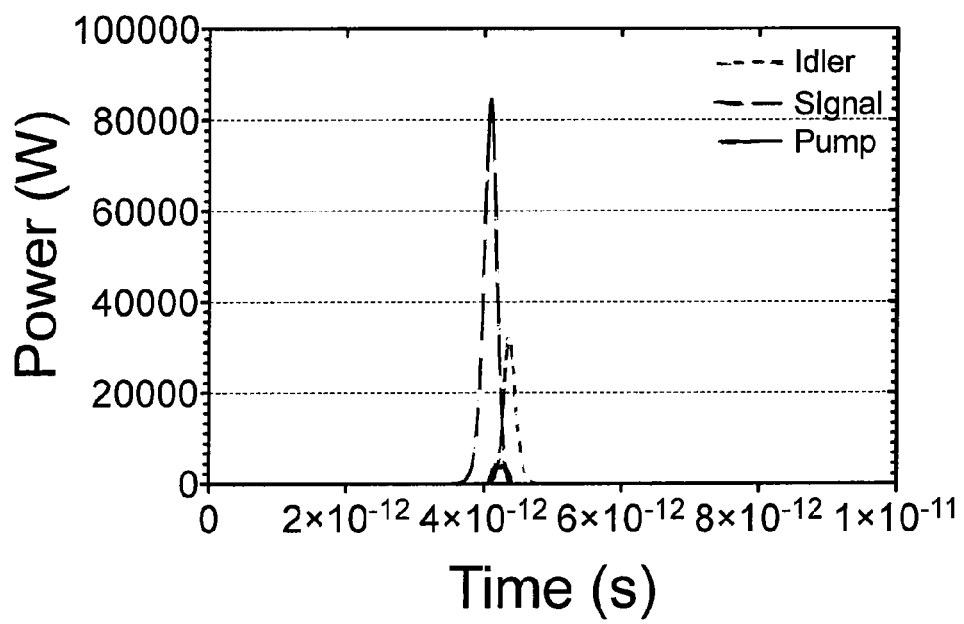
Figure 3D:
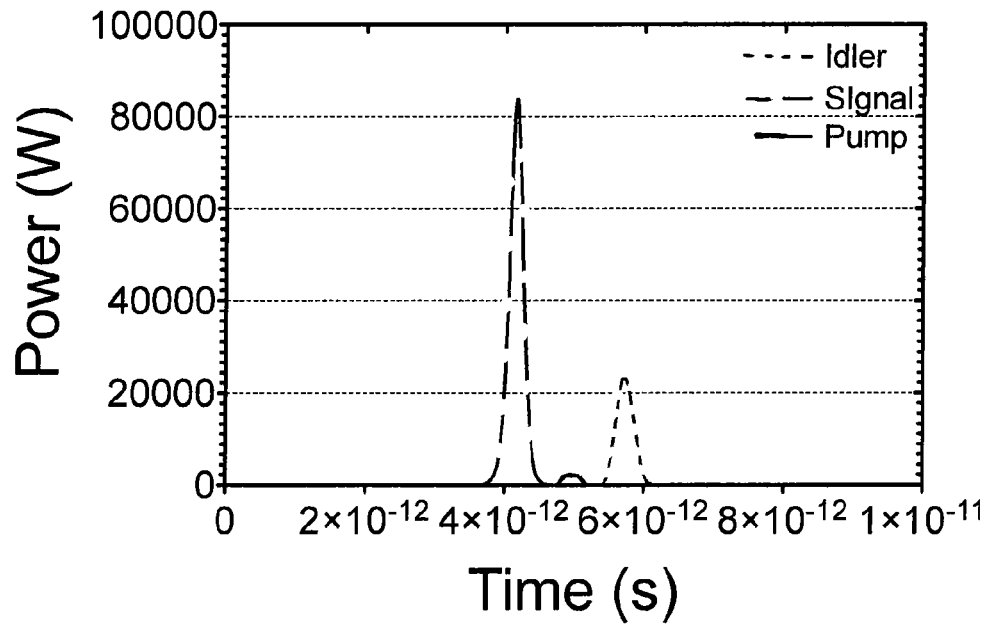
Figure 3C:
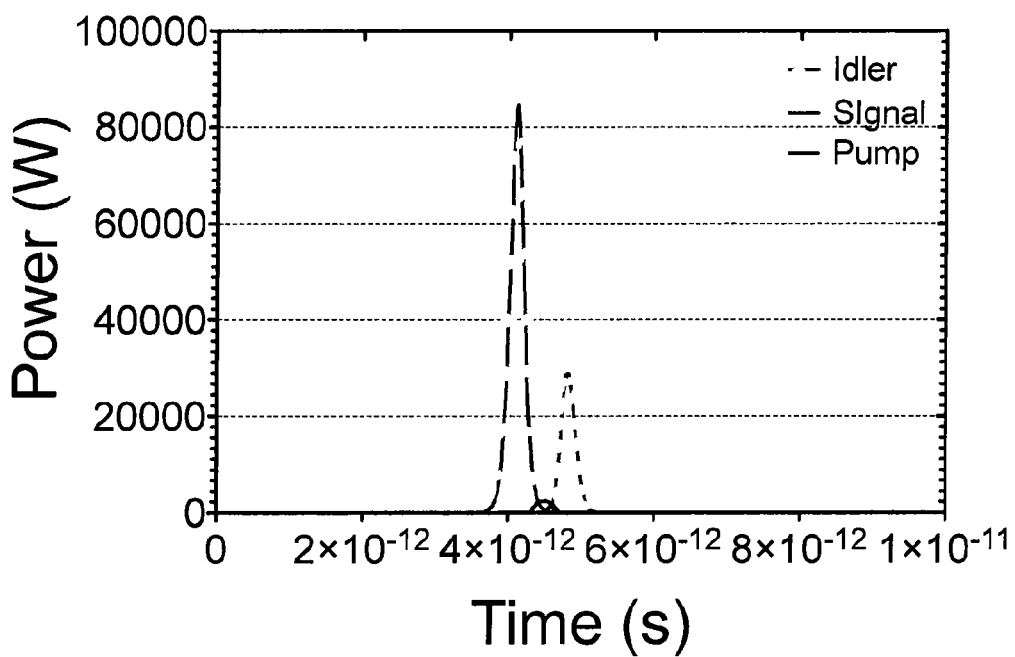
Figure 3E:
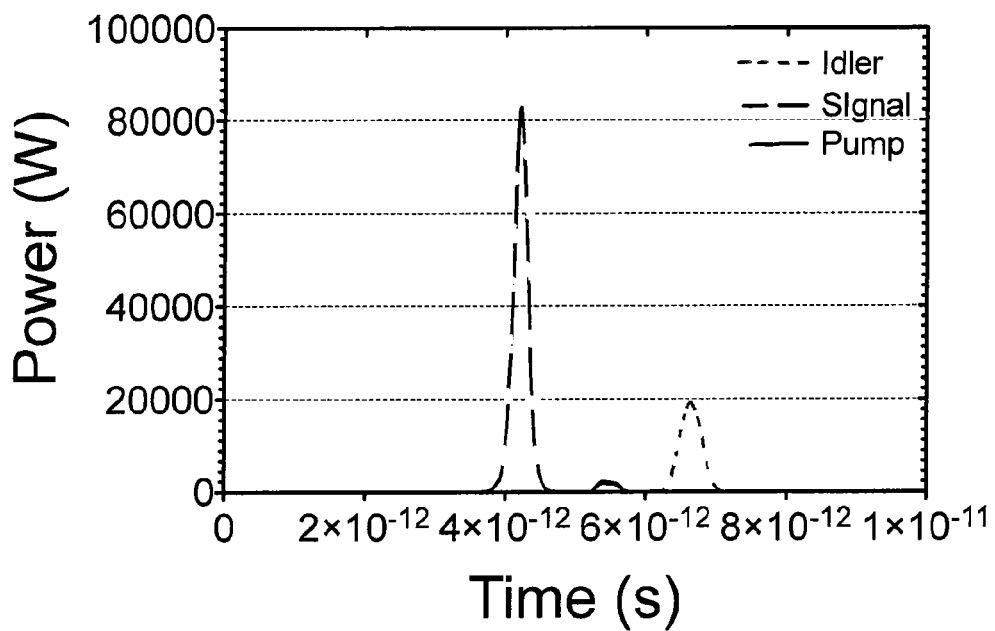
Figure 5A:
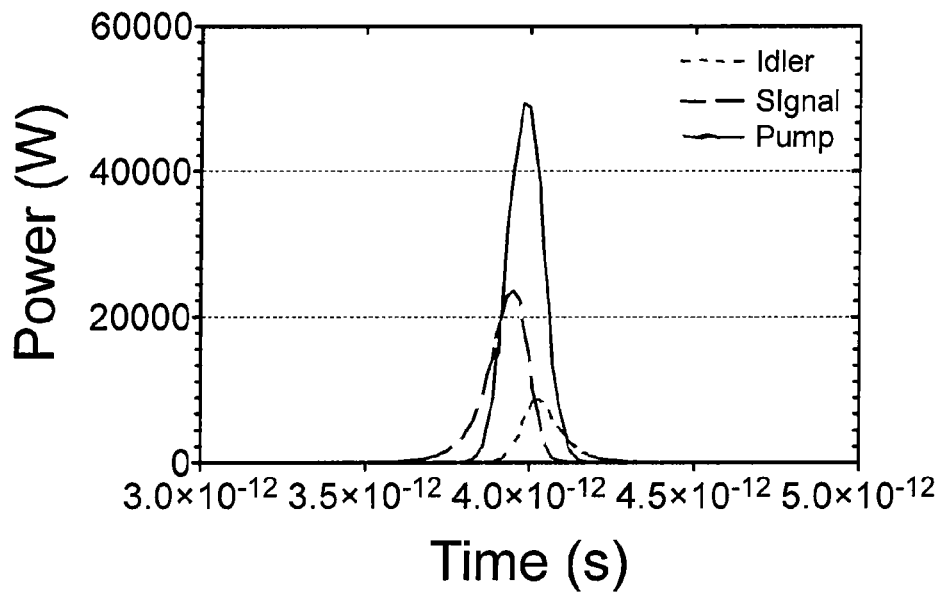
FIGS. 5(a)-(b) show an expanded trace of FIGS. 3(a)-(b).
Figure 5B:
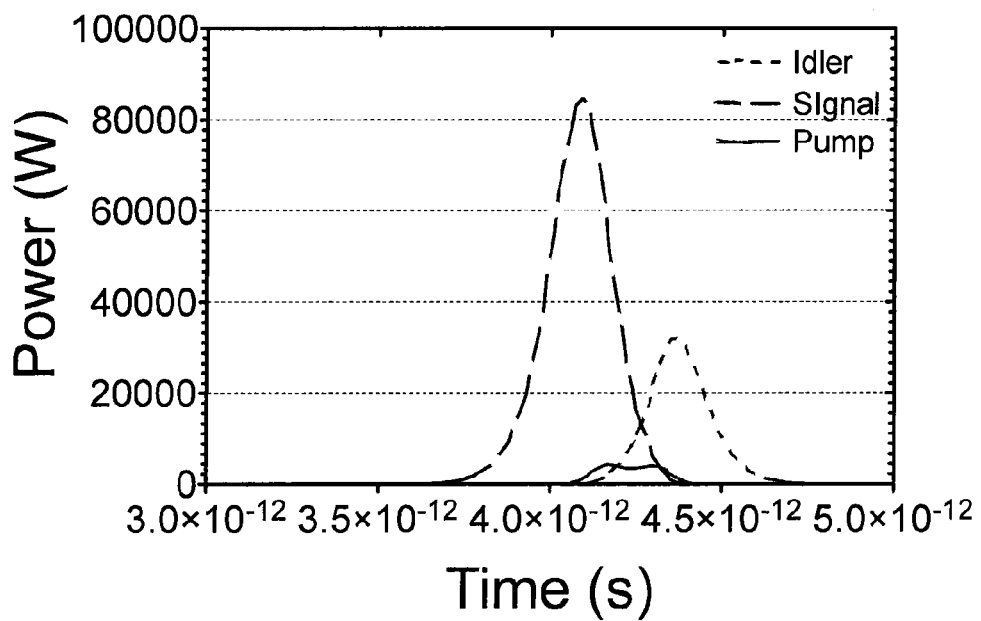

For back-conversion to occur the signal and idler pulses must overlap in time. As is apparent from FIG. 2(a-g) and FIG. 3(a-e), because the signal and idler pulses are separated, with one lying in the leading edge of the pump pulse and the other in the trailing edge, at the peak of the idler pulse the signal power is very low and at the peak of the signal pulse the idler power is very low. An expanded trace of FIGS. 3(a) and 3(b) is shown in FIG. 5(a) and FIG. 5(b) to demonstrate this. An expanded timescale in FIGS. 5(a) and (b) shows the displacement of the signal and idler pulse peaks that inhibits reconversion.

The processes described above have several important features:

They allow the effects of group velocity differences between the pump signal and idler signal to be eliminated.

They achieve remarkably high conversion efficiency, in fact larger conversion occur than are achievable with long pulses of when no difference exists between the group velocities of the interacting waves.

They allow the use of long crystals where group velocity effects would normally be a major limit to performance Because they allow the use of long crystals, they also allow the use of relatively low pump intensities, well below those that will induce optical damage and hence relatively low power pump lasers.

They allow a simple device geometry utilizing travelling waves with no complex cavities or stabilization required.

Figure 6:
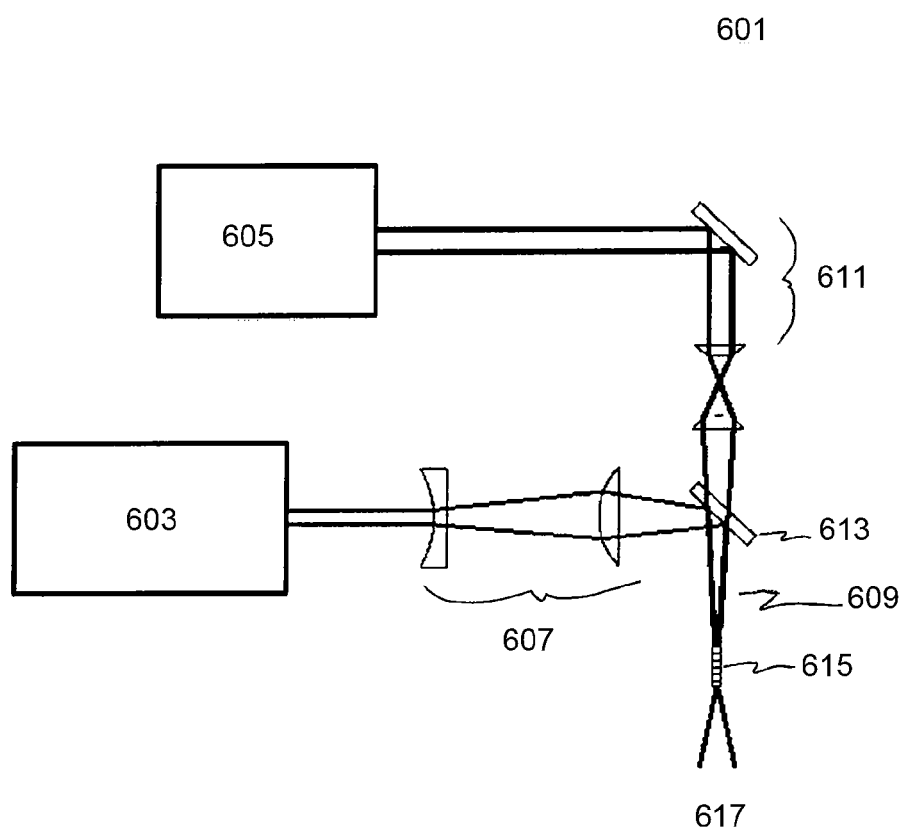
FIG. 6 shows a system block diagram of an optical parametric generator according to the present disclosure.

FIG. 6 shows an example of an optical parametric generator or source 601. The generator has a sub picosecond pump laser 603 and a tuneable seed laser 605 operating at a signal wavelength. It will be understood that, as an alternative, the seed laser could also operate at the idler wavelength.

The system also includes a first telescope 607 to direct the pump wave into the optical system 609 in order to achieve the optimal intensity for the nonlinear process. A second telescope 611 similarly directs the seed wave into the optical system 609. A dichroic mirror 613 is positioned to reflect the pump wave, and pass the signal wave, towards a second order non-linear crystal 615.

According to this example, the pump laser is a Ytterbium laser configured to emit pulses of 200 fsec in duration at 1041 nm and used to pump a periodically poled lithium niobate crystal that is 10 mm long. The poling period in the lithium niobate crystal is chosen to be 28.1 μm and the interacting waves are all polarised along the Z-axis of the crystal. The seed laser is tuned to 1407 nm which corresponds to the generation of an idler at 4000 nm. The crystal temperature is tuned in the vicinity of 150 C to achieve perfect phase matching. The pump is focussed to achieve power intensity in the vicinity of 2 GW per square cm, whilst a continuous seed beam with a power of 10 mW is focussed to an intensity of around 100 W per square cm. For this interaction, the group indices of the pump, signal and idler have values of 2.18234, 2.020991 and 2.23573 so that the pump group velocity lies intermediate between that of the signal and idler waves. In such conditions energy is converted efficiently from the pump to the signal and idler with approximately 37% of the pump energy being transferred to the amplified seed wave at 1407 nm and 13% to the generated idler wave at 4000 nm. In this calculation the full 2-D modelling short pulse model of the SNLO code was employed as opposed to the more approximate plane wave model used previously.

It will be understood that the crystal may be replaced with a crystal of any another type as described herein. Further, it will be understood that the length of the crystal may be changed to any other suitable length, such as, for example, in the range 5-25 mm, 5-15 mm, 10-20 mm, 15-25 mm etc. Further, the different crystal lengths may be used with different pump laser types as described herein.

It will be understood that the seed laser may be a low cost continuous wave laser, which may be operated at different powers, such as in the range 1-100 mW.

According to one particular example, the pump laser and seed laser may be operated at respective powers of about 100 kW and about 10 mW. Such pump powers are readily available from commercial mode-locked laser systems with pulse repetition rates in the 10's MHz range.

It will be understood that the pump power can vary widely depending on the crystal nonlinearity, which can change by several orders of magnitude.

The type of the crystal and the type of the pump laser are specifically chosen or selected so that the group velocity of the pump wave lies between the group velocity of the signal wave and the group velocity of the idler wave.

Output beams 617 are produced at signal, idler and pump wavelengths.

As will be appreciated by those skilled in the art, these are very substantial advantages compared with existing systems.

Therefore, a system used to create ultra-short optical pulses using a high gain optical parametric amplifier employing a second order nonlinear material is provided that eliminates the deleterious effects of the group velocity differences between the interacting pulses that would normally prevent the amplification process being efficient.

The group velocity of the high frequency pump which provides the gain to the optical parametric amplifier lies intermediate (i.e. between) the group velocities of the lower frequency signal and idler waves that are being amplified.

The gain induced by the pump pulse in the second order nonlinear material traps the signal and idler pulses within its envelope thereby preventing the signal and idler pulses separating from the pump pulse as would normally occur due to their different group velocities.

The herein described system works for collinear beams and does not require a short crystal as in the systems discussed in the background. Further, the system does not restrict the size of the interacting beams. Also, the system operates using a high gain optical parametric amplifier and does not require the more complex optical parametric oscillator system as described in the background section.

The second order nonlinear crystal may employ birefringent phase matching.

The second order nonlinear crystal may employ quasi phase matching by periodic poling.

The nonlinear medium may be in the form of an optical waveguide.

The nonlinear medium may be in the form of a bulk crystal.

The pump laser may produce ultra-short pulses being less than 1 picosecond in duration.

The pump wavelength is arbitrary, provided the group velocity of the pump lies intermediate between the group velocities of the signal and idler pulses.

The pump laser may use an active medium based on Ytterbium emitting between 1 and 1.05 μm.

The pump laser may use an active medium based on titanium doped sapphire operating between about 750 nm and 1100 nm.

The pump laser may use an active medium based on Neodymium emitting around 1.06 μm.

The nonlinear crystal may be quasi phase matched lithium niobate and used to convert pump radiation from between 750 nm and 1100 nm into the mid infrared.

The nonlinear crystal may be quasi phase matched lithium tantalate and used to convert pump radiation from between 750 nm and 1100 nm into the mid infrared.

The maximum efficiency with which energy can be converted from the pump to the signal and idler waves may be enhanced because back-conversion from the signal and idler pulses into the pump is inhibited because the signal and idler pulses do not overlap in time.

It will be understood that the second order non-linear crystal may include one or more of the KTP (Potassium titanyl phosphate (KTiOPO4)) family of crystals, as these have the correct relationship between the group velocities in the range of wavelengths in a periodically poled (PP) form.

It will also be understood that a general chemical composition of a family of suitable non-linear crystals is MTiOXO4 where M may be K, Rb or Cs and X may be P or As.

According to one example, PP-KTP has a suitable group velocity relationship at operating wavelengths of around 3.4 μm when using a 1064 nm pump. As a further example, PP-KTA (Potassium titanyle arsenate (KTiOAsO4)) also has a suitable group velocity relationship at operating wavelengths of around 3.8 μm, also when using a 1040 nm pump.

INDUSTRIAL APPLICABILITY

The arrangements described are applicable to the optical sensing industries and particularly for the optical parametric generator industry.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

I claim:

1. An optical parametric generator comprising:
   a seed laser feeding an optical system, wherein the seed laser is arranged to provide a seed beam at either a signal frequency of a signal wave or an idler frequency of an idler wave;
   a pump laser of a defined type feeding the optical system, wherein the pump laser emits ultra-short optical pulses as a pump wave, wherein the ultra-short optical pulses emitted by the pump laser are less than 1 picosecond in duration; and
   a second order non-linear crystal of a defined type arranged in the optical system;
   wherein the defined type of the crystal and the defined type of the pump laser are selected so that the signal wave or the idler wave are locked in an edge of the pump wave.

2. The optical parametric generator of claim 1, wherein the gain of the optical parametric generator is in the range of 40-70 dB/cm.

3. The optical parametric generator of claim 2, wherein the gain of the optical parametric generator is in the range of 50-60 dB/cm.

4. The optical parametric generator of claim 2, wherein the gain of the optical parametric generator is in the range of 60-70 dB/cm.

5. The optical parametric generator of claim 1, wherein the defined type of the crystal is selected from the group consisting of: lithium niobate and lithium tantalate.

6. The optical parametric generator of claim 1, wherein the defined type of the crystal is selected from crystals having a length in the range of 5-25 mm.

7. The optical parametric generator of claim 1, wherein the defined type of the pump laser is selected from pump lasers that generate a pump wave having a wavelength range of 750 nm-1100 nm, or 1000 nm-1050 nm, or a wavelength of 1.06 μm.

8. The optical parametric generator of claim 1, wherein the defined type of the pump laser is selected from pump lasers having an active medium in the group consisting of: ytterbium, titanium doped sapphire, and neodymium.

9. The optical parametric generator of claim 1, wherein the polarisations of the signal wave, idler wave and/or pump wave are chosen to achieve birefringent phase matching.

10. The optical parametric generator of claim 1, wherein the polarisations of the signal wave, idler wave and/or pump wave are chosen to achieve quasi phase matching.

11. The optical parametric generator of claim 10, wherein the pump wave is between 750 nm and 1100 nm and the optical parametric generator converts the pump wave into the mid-infrared range.

12. The optical parametric generator of claim 11, wherein the crystal is lithium tantalate, lithium niobate, potassium titanyl phosphate, or isomorphs of potassium titanyl phosphate.

13. The optical parametric generator of claim 1, wherein the length of the crystal completes separation of the interacting pump, idler and signal waves based on their respective group velocities.

14. The optical parametric generator of claim 1, wherein the defined type of the crystal and the defined type of the pump laser are selected so that pump wave has a group velocity which is the average of the group velocity of the signal wave and the group velocity of the idler wave.

15. The optical parametric generator of claim 1, wherein the relationship between the length of the non-linear crystal and group indices of the pump, signal and idler waves may be defined by $L_c > c\,\tau_p/(|n_{g:p} - n_{g:s,i}|)$ where $L_c$ is a length of the non-linear crystal, $n_{g:p,s,i}$ are group indices of the pump, signal and idler waves respectively and $\tau_p$ is the duration of the pump wave.

16. The optical parametric generator of claim 1, wherein the defined type of the crystal and the defined type of the pump laser are selected so that a pump wave group velocity lies between a signal wave group velocity and an idler wave group velocity.

17. A method of controlling an optical parametric comprising a seed laser feeding an optical system, a pump laser of a defined type feeding the optical system, wherein the pump laser emits ultra-short optical pulses as a pump wave, wherein the ultra-short optical pulses emitted by the pump laser are less than 1 picosecond in duration, and a second order non-linear crystal of a defined type arranged in the optical system, the method comprising the steps of:
   arranging the seed laser to provide a seed beam at either a signal frequency of a signal wave or an idler frequency of an idler wave; and
   selecting the defined type of the crystal and the defined type of the pump laser so that the signal wave or the idler wave are locked in an edge of the pump wave.

18. The method of claim 17 further comprising the step of selecting the defined type of the crystal and the defined type of the pump laser so that a pump wave group velocity lies between a signal wave group velocity and an idler wave group velocity.

* * * * *